US012798738B2

(12) United States Patent
Dowell

(10) Patent No.: US 12,798,738 B2
(45) Date of Patent: Nov. 17, 2026

(54) SYSTEMS AND METHODS FOR CREATING A MISSION FILE FOR AN UNDERWATER HANDHELD COMPUTER

(71) Applicant: Cardinal Point Captains, Inc., San Diego, CA (US)

(72) Inventor: Alexander Dowell, San Diego, CA (US)

(73) Assignee: Cardinal Point Captains, Inc., San Diego, CA (US)

( * ) Notice: Subject to any disclaimer, the term of this patent is extended or adjusted under 35 U.S.C. 154(b) by 0 days.

(21) Appl. No.: 18/601,732

(22) Filed: Mar. 11, 2024

(65) Prior Publication Data

US 2025/0033749 A1 Jan. 30, 2025

Related U.S. Application Data

(60) Provisional application No. 63/451,192, filed on Mar. 9, 2023.

(51) Int. Cl.
*B63C 11/26* (2006.01)
*B63C 11/02* (2006.01)
*G06T 11/10* (2026.01)

(52) U.S. Cl.
CPC .............. *B63C 11/26* (2013.01); *G06T 11/10* (2026.01); *B63C 2011/021* (2013.01)

(58) Field of Classification Search
CPC ............... B63C 11/26; B63C 2011/021; G06T 11/001
See application file for complete search history.

(56) References Cited

U.S. PATENT DOCUMENTS

| | | | | |
|---|---|---|---|---|
| 4,949,317 A | | 8/1990 | McQuitty | |
| 5,579,285 A | * | 11/1996 | Hubert | G01S 19/18 367/133 |
| 6,359,834 B1 | * | 3/2002 | English | G01S 19/18 367/133 |
| 6,794,571 B1 | | 9/2004 | Barringer | |

(Continued)

FOREIGN PATENT DOCUMENTS

| | | | | |
|---|---|---|---|---|
| ES | 2895454 T3 | * | 2/2022 | G06T 19/006 |
| GB | 190804397 A | * | 1/1909 | |
| WO | WO-2010051629 A1 | * | 5/2010 | B63H 25/46 |

OTHER PUBLICATIONS

Bluepoint Subsea ("Oculus M-Series Single & Dual Frequency Sonars." Oceanbotics, Aug. 24, 2020. Internet archive, https://oceanbotics.com/wp-contenUuploads/2020/08/8.24.20-pg1 .1-1.pdf, "Bluepoint") (Year: 2020).

(Continued)

*Primary Examiner* — Daniel Pihulic
(74) *Attorney, Agent, or Firm* — Procopio, Cory, Hargreaves & Savitch LLP; Pattric J. Rawlins

(57) ABSTRACT

A system comprising: at least one hardware processor; and one or more software modules that are configured to, when executed by the at least one hardware processor, receive one or more inputs related to the creation of a mission file for an underwater surveying or location mission; import data from one or both of US Navy software applications COIN and MineNet; and create a mission file based on the received inputs and the imported data, the mission files to be created.

21 Claims, 9 Drawing Sheets

(56) References Cited

U.S. PATENT DOCUMENTS

| | | | | |
|---|---|---|---|---|
| 7,760,587 | B2 * | 7/2010 | Abbot | G01S 11/14 367/131 |
| 10,298,910 | B1 | 5/2019 | Kroeger | |
| 10,408,933 | B1 | 9/2019 | DeHart | |
| 10,444,349 | B2 * | 10/2019 | Gatland | G01C 21/203 |
| 2007/0159922 | A1 | 7/2007 | Zimmerman | |
| 2008/0046139 | A1 * | 2/2008 | Basilico | B63C 11/02 701/21 |
| 2011/0141853 | A1 | 6/2011 | Megdal | |
| 2011/0297070 | A1 * | 12/2011 | Riggs | B63G 8/18 114/330 |
| 2015/0200996 | A1 | 7/2015 | Ziarati | |
| 2015/0336650 | A1 | 11/2015 | Fenu | |
| 2016/0259029 | A1 | 9/2016 | Jukkala | |
| 2017/0332612 | A1 | 11/2017 | Partan | |
| 2018/0164434 | A1 | 6/2018 | Stokes | |
| 2018/0335511 | A1 | 11/2018 | Brown | |
| 2019/0263487 | A1 | 8/2019 | Corl | |
| 2024/0248482 | A1 | 7/2024 | Rekdal | |
| 2024/0302512 | A1 * | 9/2024 | Dowell | G01S 15/89 |
| 2025/0033749 | A1 * | 1/2025 | Dowell | G06T 11/001 |
| 2025/0035762 | A1 * | 1/2025 | Dowell | G01S 15/89 |
| 2025/0035764 | A1 * | 1/2025 | Dowell | G01S 15/89 |

OTHER PUBLICATIONS

Bluepoint Subsea ("Artemis-Pro." Bluepoint Subsea, Nov. 28, 2021. Internet archive, https://www.blueprintsubsea.com/ artemis/ artemis-pro, "Bluepoint 2" (Year: 2021).

Seacraft ("Seacraft Go!" Seacraft, Dec 10, 2022. Internet archive, https://web.archive.org/web/20221210091839/ https://seacraft.eu/ products/scooters/go/, "Seacraft") (Year: 2022).

Official Action mailed Mar. 12, 2026 in U.S. Appl. No. 18/601,793, 13 pages.

Official Action mailed Oct. 1, 2025 in U.S. Appl. No. 18/601,811, 16 pages.

Official Action mailed Jun. 10, 2026 in U.S. Appl. No. 18/601,811, 12 pages.

Official Action mailed Sep. 25, 2025 in U.S. Appl. No. 18/601,847, 17 pages.

Official Action mailed May 7, 2026 in U.S. Appl. No. 18/601,847, 10 pages.

* cited by examiner

FIG. 9
Console
Video Camera
Dive Light
Forward Looking Sonar
Blanking Plug
Battery Pod Retaining Clips
Battery Pod
302
Navigation Pod
GNSS Receiver
AHRS Sensor (Pitch/Roll/Yaw)
Doppler Velocity Logger (DVL) Pod
Display
Handgrips
Keypad Buttons (x10)

SYSTEMS AND METHODS FOR CREATING A MISSION FILE FOR AN UNDERWATER HANDHELD COMPUTER

RELATED APPLICATIONS

This application claims priority to U.S. Provisional application, 63/451,192, filed Mar. 9, 2023, entitled "SYSTEMS AND METHODS FOR CREATING A MISSION FILE FOR AN UNDERWATER HANDHELD COMPUTER," the contents of which is incorporated herein by reference in its entirety.

GOVERNMENT LICENSE RIGHTS

This invention was made with government support under Project Agreement No. 1 for UTIC-20-02-005-004, UTIC Base Agreement No. 2020-599 in support of Contract No. N66604-18-9-0001 awarded by Advanced Technology International (ATI). The government has certain rights in the invention.

BACKGROUND

Field of the Invention

The embodiments described herein are generally directed to a handheld underwater computer, and more particularly to handheld underwater computer that incorporates a target detection multibeam sonar, DVL, Camera, Dive-Light, Acoustic Positioning, Data Modem and GNSS navigation aids, designed to assist divers navigate underwater or perform seabed surveying and location of objects.

Description of the Related Art

Conventional underwater computers, such as the ArtemisPRO sold by Blueprint Subsea, are often used for swimming a predetermined path or to coordinates using acoustic dead-reckoning, without the need to resurface; search and location of unexploded ordnance by mine clearance divers, commercial EOD divers, etc., sub-surface navigation, area survey and bottom profiling operations, and lost property, vehicles, aircraft, missing persons, wrecks by police or search & rescue divers. An example ArtemisPRO 302 is illustrated in FIG. 3. In FIG. 3, user interface 304 can be seen. Certain screens that can be included as part of user interface 304, in accordance with the embodiments described herein are described below. FIG. 9 illustrates the ArtemisPro 302 in more detail and in various views.

Such computers can interface with software application(s) that allow creation of "Mission" files, e.g., containing background chart graphics, navigation waypoints that the diver can choose as destinations during the dive, or use to map out a search-pattern or course to swim. Mission markers can be entered in text form, positioned over imported S57/S63 nautical charts or from other third-party sources (such as Google Earth) in formats including CSV, GPX or KML.

The diver's position, heading, depth, and course history can be shown on the ArtemisPRO's display with any selected mission marker. Additional points of interest may also be added during the dive and reviewed post-dive. ArtemisPRO incorporates a 4 beam, 1 MHz Doppler Velocity Log (DVL) with a 50+ meter bottom tracking range and a velocity resolution of 1 mm/second. The DVL is used to interpolate the diver's position and speed over ground when a, e.g., GNSS fix is not available. The output from the DVL also tracks the height of the diver above the seabed and this information, in conjunction with the pressure sensor data, gives total water column depth. Position drift over time can be corrected by augmentation with occasional GNSS locations.

While conventional underwater computers, such as the ArtemisPRO are excellent systems, some critical applications may require higher performance in certain areas.

SUMMARY

Accordingly, systems, methods, and non-transitory computer-readable media are disclosed to provide improved and new features in a handheld underwater computer.

According to one aspect, a system comprising: at least one hardware processor; and one or more software modules that are configured to, when executed by the at least one hardware processor, receive one or more inputs related to the creation of a mission file for an underwater surveying or location mission; import data from one or both of US Navy software applications COIN and MineNet; and create a mission file based on the received inputs and the imported data. the mission files to be created.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for operating a handheld underwater computer.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

1.1. Infrastructure

Figure 1:
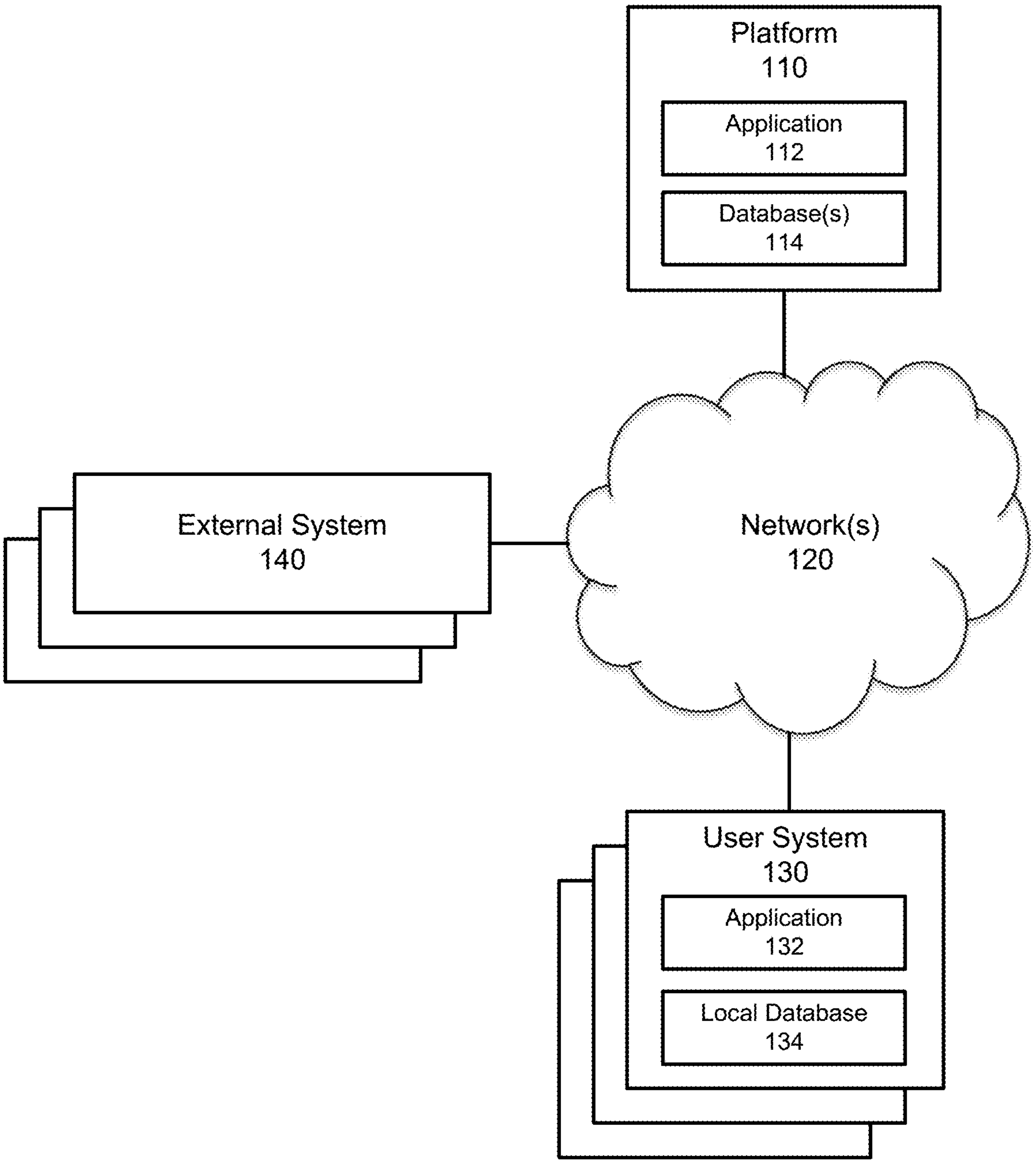
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various processes, methods, functions, and/or software modules described herein. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed. Platform 110 may also comprise or be communicatively connected to a server application 112 and/or one or more databases 114. In addition, platform 110 may be communicatively connected to one or more user systems 130, which can be an underwater computer system, via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. Each user system 130 may comprise or be communicatively connected to a client application 132 and/or one or more local databases 134.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. It should be understood that platform 110 may also respond to other requests from user system(s) 130.

Platform 110 may comprise, be communicatively coupled with, or otherwise have access to one or more database(s) 114. For example, platform 110 may comprise one or more database servers which manage one or more databases 114. Server application 112 executing on platform 110 and/or client application 132 executing on user system 130 may submit data (e.g., user data, form data, etc.) to be stored in database(s) 114, and/or request access to data stored in database(s) 114. Any suitable database may be utilized, including without limitation MySQL™, Oracle™, IBM™, Microsoft SQL™, Access™, PostgreSQL™, MongoDB™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from user system(s) 130 and/or external system(s) 140, and provide responses in extensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130, may interact with a server application 112 executing on platform 110 to execute one or more or a portion of one or more of the various functions, processes, methods, and/or software modules described herein.

Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

1.2. Example Processing Device

Figure 2:
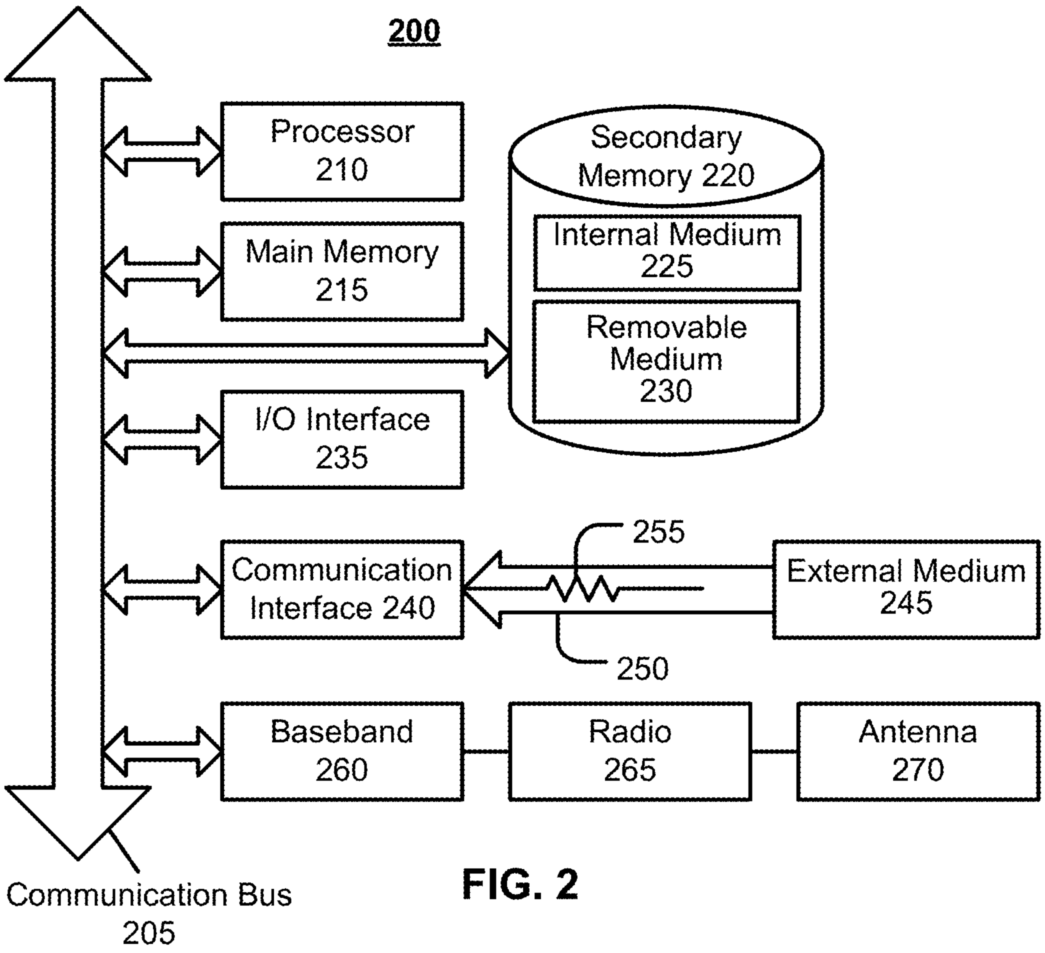
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the processes, methods, or functions (e.g., to store and/or execute the software) described herein, and may represent components of platform 110, user system(s) 130, external system(s) 140, and/or other processing devices described herein. System 200 can be any processor-enabled device (e.g., server, personal computer, etc.) that is capable of wired or wireless data communication. Other processing systems and/or architectures may also be used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Python, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 include an external hard disk drive, an external optical drive, an external magneto-optical drive, and/or the like.

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet computer, or other mobile device).

I/O interface can also be used in an underwater computer system to interface with, e.g., multibeam sonar, DVL, Camera, Dive-Light, Acoustic Positioning, Data Modem and GNSS navigation aids.

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, can enable system 200 to perform the various functions of the disclosed embodiments.

2. Process Overview

Embodiments of processes for operating a handheld underwater computer will now be described in detail. It should be understood that the described processes may be embodied in one or more software modules that are executed by one or more hardware processors (e.g., processor 210), for example, as a software application (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the software application are executed by platform 110 and other portions or modules of the software application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processor(s) 210. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for case of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Figure 4:
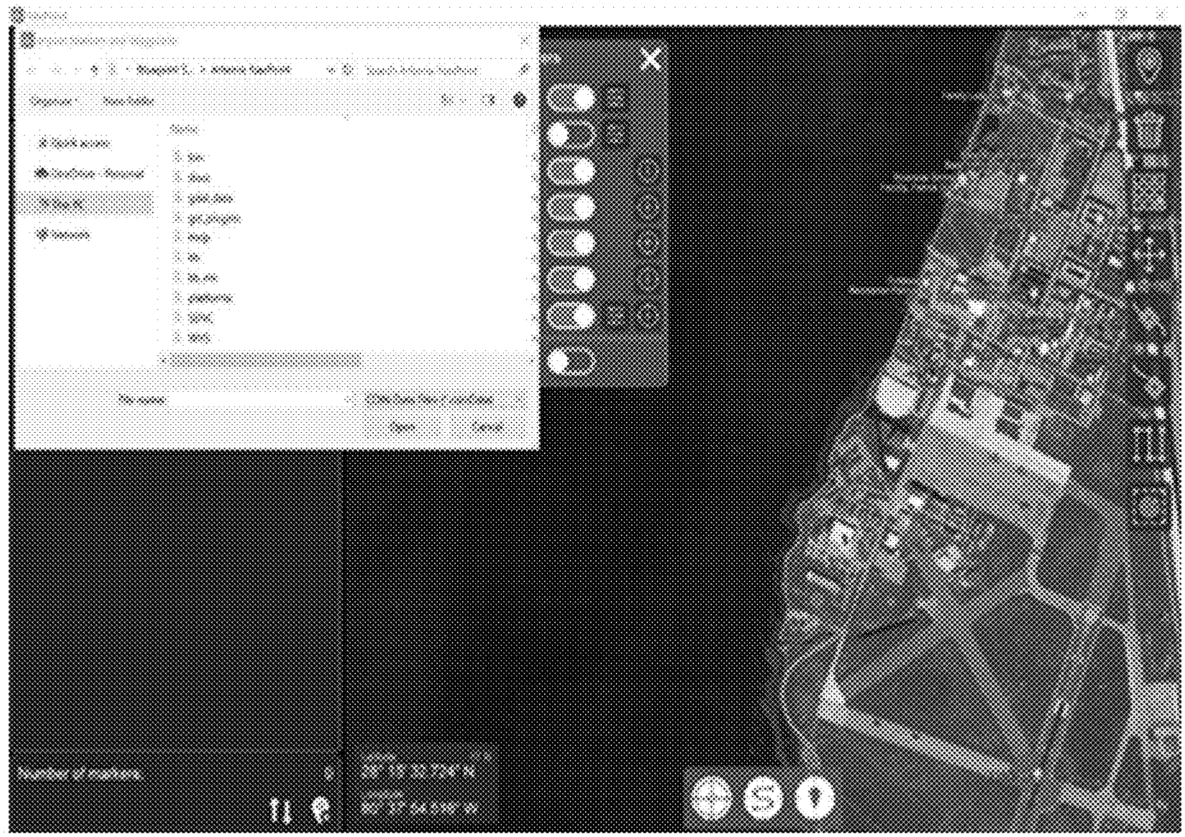
FIGS. 4-7 are screenshots illustrating portions of a User Interface that can be included in the handheld underwater computer of FIG. 3.

As noted, underwater computer systems can be configured to interface with, e.g., PC based, or platform 110 based software programs or applications 112 that allow the mission files to be created. In certain embodiments, software programs that can be included in the architecture of FIG. 1 can be configured to import and export data with US Navy software applications COIN and MineNet. Thus, the software programs 112 can be configured with APIs that allow the software to import data from COIN and MineNet. FIG. 4 is a screenshot that illustrates the importation of the markers and waypoints form a COIN data files.

2.1. Import and Export of Data

COIN and MineNET are Government-owned software that are used by the U.S. Navy Explosive Ordnance Disposal community to plan, review, and disseminate information for mine warfare command and control in real-time to support Navy operations and decision making. Both COIN and MineNET are critical tools for the Navy to maintain situational awareness in oceanographic and mine warfare environments.

Thus, in certain embodiments, a user can access an application such as application 112 using a user system 130 and set up a mission file. But in so doing, the application 112 can use API's to access COIN and/or MineNet to access information that may impact the mission and therefore the mission file. In certain embodiments some or all of the mission setup, including access to COIN and MineNet can be accomplished using application 132. The mission file can then be downloaded to underwater computer system 302. In other embodiments, underwater computer system 302 can actually be the user system 130 removing the need to interface with another user system, such as a PC, or platform 110.

2.2. Sonar Color Panels

In certain embodiments, the processes implemented by underwater computer system 302/130 can be configured to display different sonar color palettes. This is important so that users can enhance the visualization of the data. The colors can highlight different features of the sonar image, making it easier to identify and interpret. Using different colors can help the user to distinguish between different types of underwater objects, such as rocks, coral, and manmade objects, which may have different acoustic properties that are reflected in the sonar image.

Figure 5:
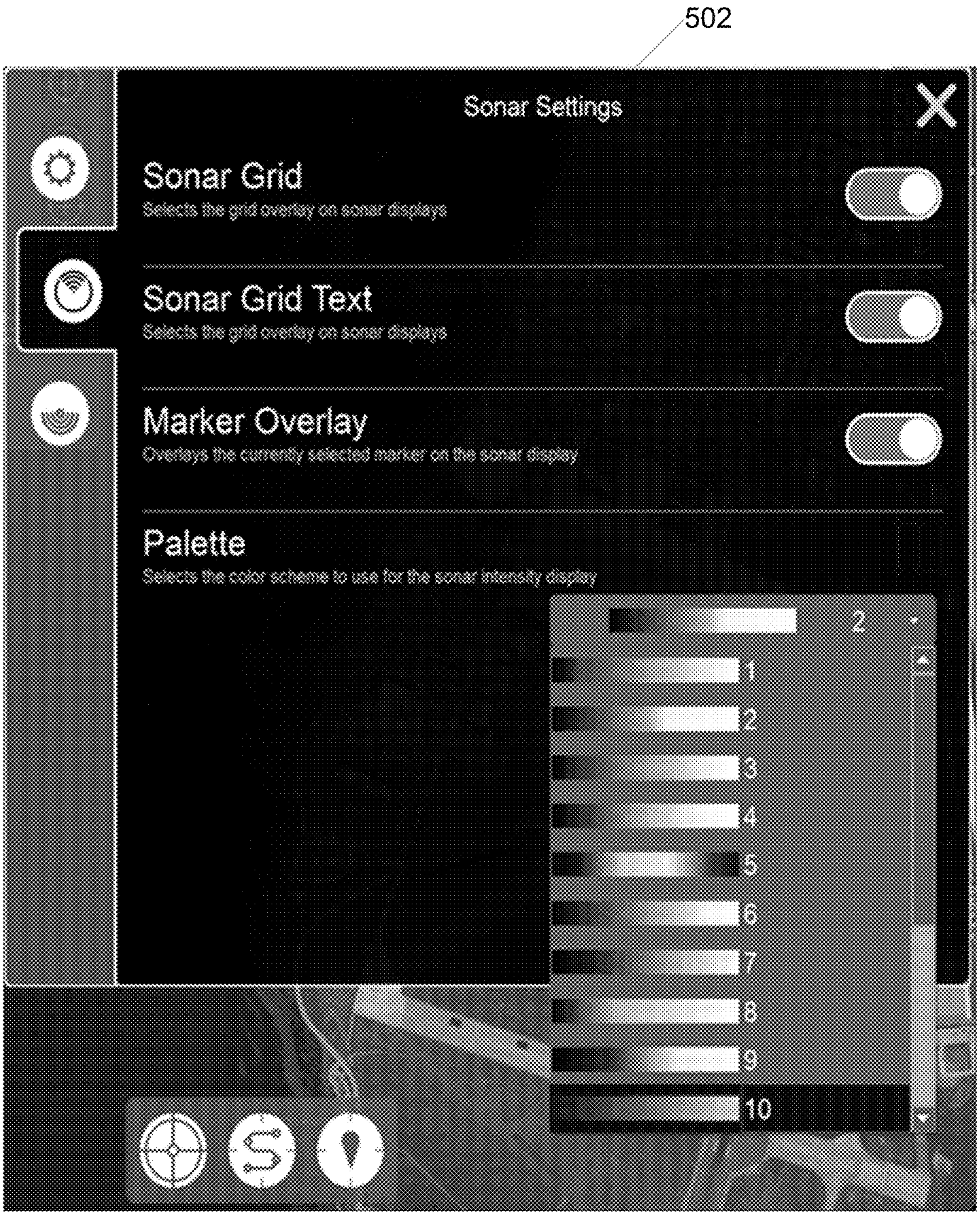

FIG. 5 is a screenshot that illustrates a user interface 502 that can be used to configure the sonar grid, sonar grid text, marker overlay and palette to be used.

2.3 Updated Display

In certain embodiments, the processes implemented by underwatering computer system 130 can be configured to display unique information such as last known date, time, location of a magnetic heading calibration, and the diver's depth to the right side of the sonar fan image. Knowing the last known date and time of a GPS update is important because it can indicate the reliability of the GPS data. GPS signals can be affected by various factors, so the accuracy of GPS location information can deteriorate over time. This information can help identify potential issues with the GPS device or its settings, and can also assist with route planning and navigation. Ensuring that GPS data is reliable and accurate is crucial for many applications, including mapping, navigation, and location-based services.

Updating the diver's depth to the right side of the sonar fan image is important because it enables the diver to monitor the depth of the diver while monitoring the full image from the sonar. The previous design prevented the diver from seeing the full picture of the sonar because the depth covered the image.

2.4 Pinger

In certain In certain embodiments, the processes implemented by underwatering computer system 130 can be configured to display a pinger locator feature. A pinger locator is a device that is used to detect and locate the underwater acoustic signals emitted by a pinger. Pingers emit a repeating acoustic pulse that can be used to locate submerged objects. Pinger locators receive the acoustic signals from the pinger and analyze their frequency, amplitude, and other characteristics to determine the location of the pinger. The device typically includes a hydrophone or underwater microphone, a signal processing unit, and a display or output device that shows the location of the pinger. Pinger locators are commonly used in search and rescue operations, marine salvage operations, and underwater exploration to help locate lost or submerged objects.

In certain embodiments, the underwater computer system 130 can interface with a multibeam imaging sonar that uses a 12 degree aperture on a 750k frequency band. A multibeam imaging sonar is a device that uses multiple beams of sound waves to create a 2D image of underwater objects. The sonar emits sound waves in a fan-shaped pattern, which bounce off objects and return to the device. The device then uses the time and strength of the returning echoes to create a detailed image of the objects. Multibeam imaging sonars are used in a variety of applications, including underwater mapping, marine biology research, and search and rescue operations. They offer high resolution and accuracy, allowing for detailed imaging of complex underwater environments.

Figure 6:
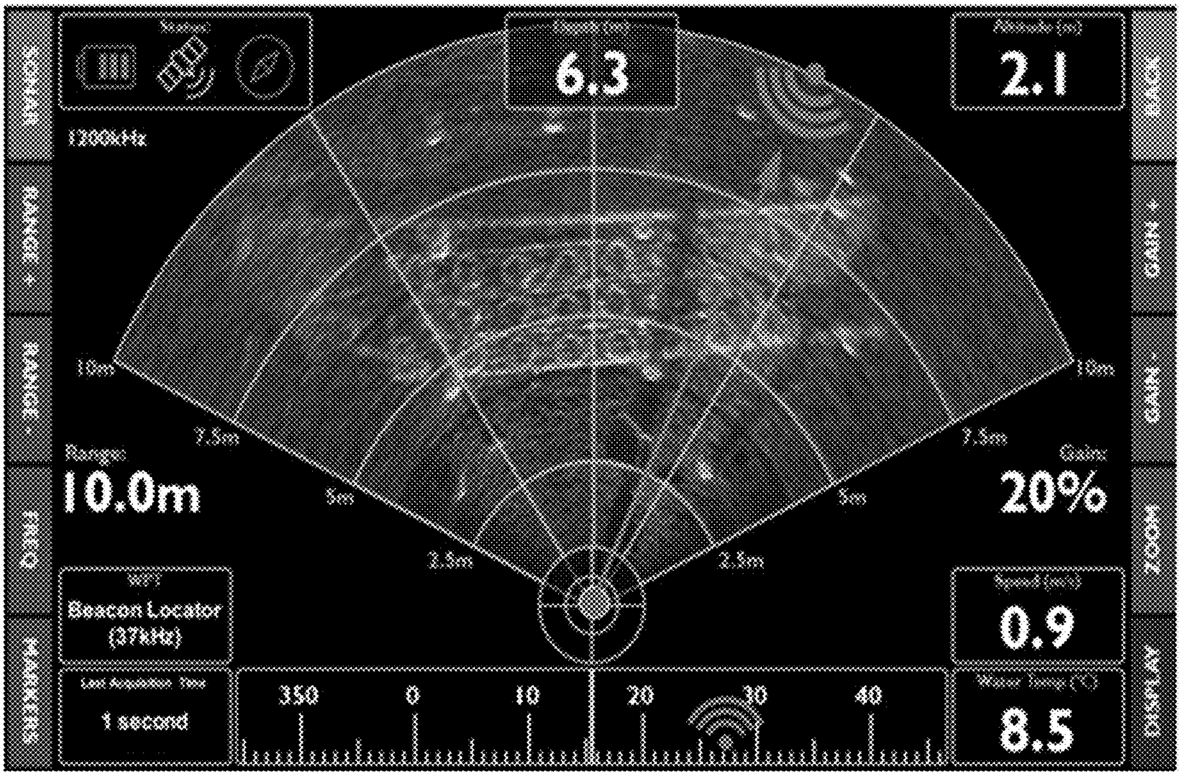

FIG. 6 is a screenshot illustrating a pinger locator mode as viewed on multibeam imaging sonar.

Using a narrow aperture transmitter, like the 12 degree one used here, can provide several advantages. Firstly, it can improve the resolution and clarity of the sonar image, as the narrow beam width allows for more precise targeting and detection of objects.

Secondly, it can reduce interference from other sources, as the narrow beam helps to focus the sonar signal and minimize the impact of noise and echoes.

Figure 7:
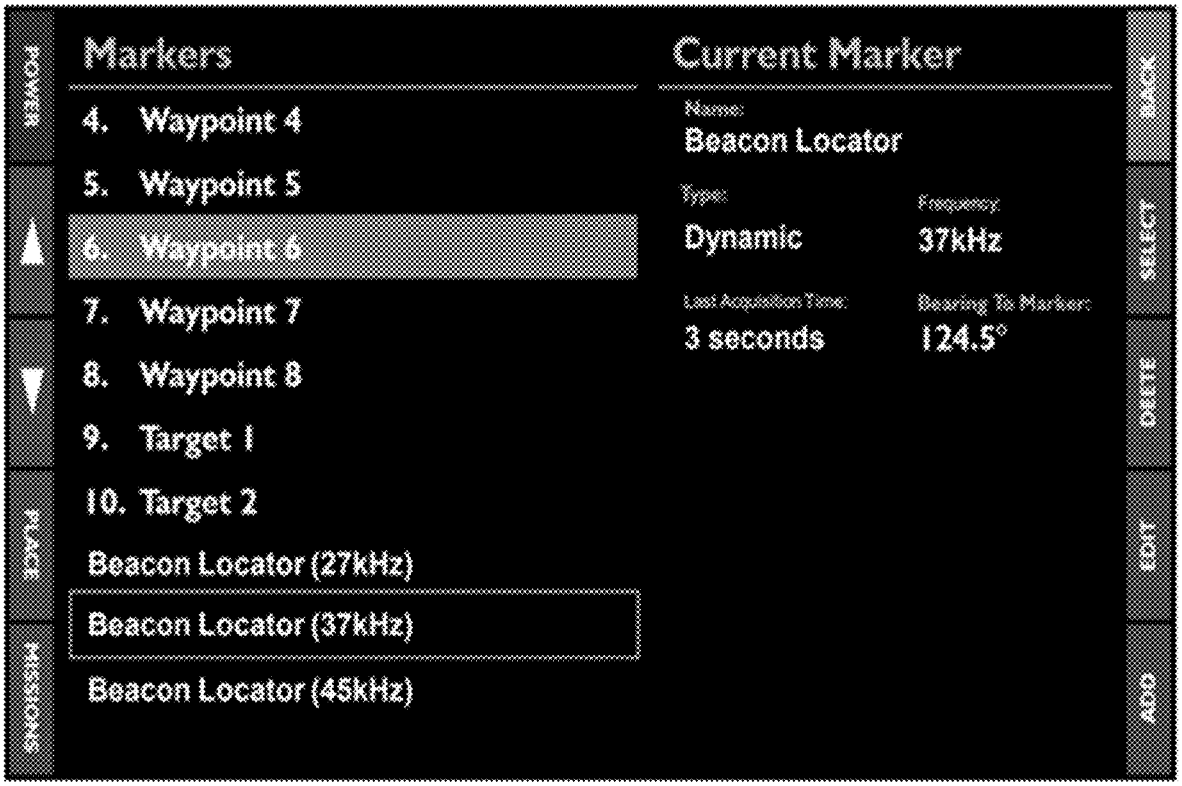

In certain other embodiments the sonar is then used as a pinger locator that can determine the location of a variety of different frequency pingers. FIG. 7 is a screen shot illustrating a sample beacon frequencies and associated markers generated from the Pinger location mode.

3. Hardware

Certain embodiments can also incorporate some or all of the following hardware features in underwater computer system 1300.

3.1 Bezel Material

Figure 3:
FIG. 3 illustrates an example conventional handheld underwater computer.

In certain embodiments, the bezel shown in FIG. 3 is made of Beryllium Copper (BeCu) to reduce the magnetic signature.

3.2 Heads Up Display

Figure 8:
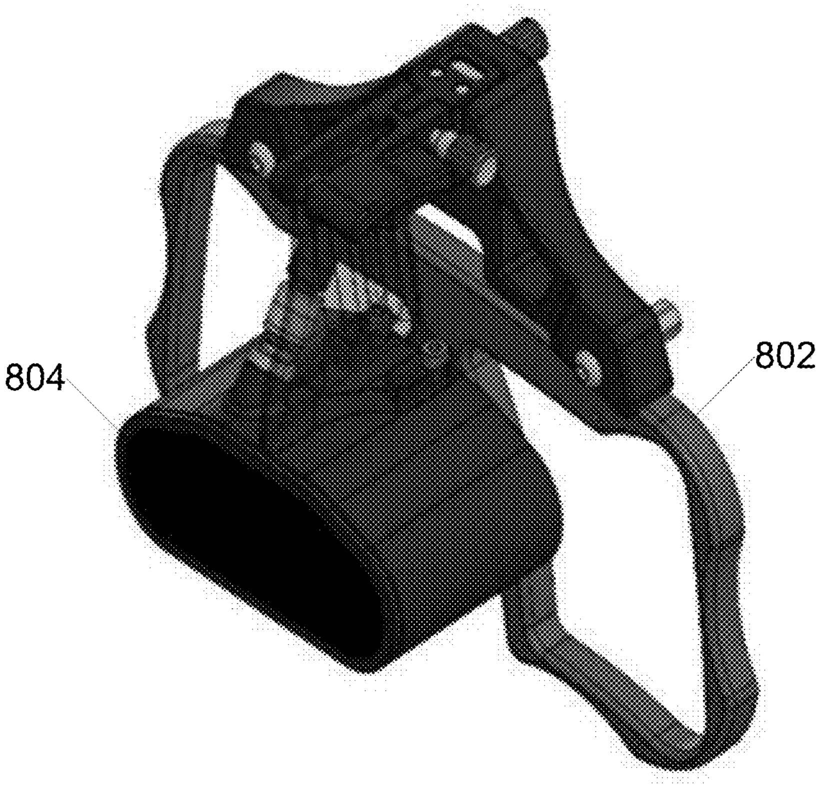
FIG. 8 is a diagram illustrating a heads-up display that can be used with the handheld underwater computer of FIG. 3.
Figure 9:
FIG. 9 is a diagram illustrating the handheld underwater computer of FIG. 3 in more detail.

In certain embodiments a tethered, binocular-style heads up display 802 is incorporated that mounts to a, e.g., Kirby Morgan MK-48, diving mask 804 and plugs into the system, i.e., interfaces via I/O interface 235 and the process implemented by the underwater computer system 130 can be configured to mirror the display of system 130 as illustrated in FIG. 8.

An, e.g., Y-port splitter can also be included that enables a diver to use the heads up display and a tethered GPS simultaneously.

3.3 Lithium Ion Battery

In certain embodiments system 130 can include a 300 Wh Lithium Ion battery pod or a 97 Wh Lithium Ion battery pod, and a Lithium Ion battery charger. NiMH (Nickel Metal Hydride) and Li-Ion (Lithium-Ion) batteries differ in their chemistry, energy density, and lifespan. Li-Ion batteries are more energy-dense and have a longer lifespan compared to NiMH batteries.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. An underwater handheld computer system comprising:
at least one hardware processor;
a display;
a heads up display configured to mirror data displayed on the display; and
one or more software modules that are configured to, when executed by the at least one hardware processor,
receive one or more inputs related to an underwater surveying or location mission;
import data from one or more software applications; and
create a mission file based on the received inputs and the imported data.

2. The underwater handheld computer system of claim 1, wherein the one or more software modules that are further configured to, when executed by the at least one hardware processor, download the mission file.

3. The system of claim 1, wherein the imported data is from one or both of US Navy software applications COIN and MineNet and the COIN and/or MineNet data is imported via API's.

4. The underwater handheld computer system of claim 2, wherein the underwater handheld computer is configured to receive a selection of a mission marker and display a diver's position, heading, depth and course history for the selected mission marker.

5. A system comprising:

at least one hardware processor;

a user interface; and one or more software modules that are configured to, when executed by the at least one hardware processor, receive one or more inputs related to an underwater surveying or location mission;

import data from one or more software applications;

create a mission file based on the received inputs and the imported data; and download the mission file, wherein the user interface comprises a sonar display comprising a plurality of sonar color palettes.

6. The underwater handheld computer system of claim 4, wherein the underwater handheld computer is further configured to display:

the diver's position and speed over ground;

the height of the diver above the seabed;

pressure sensor data; and water column depth.

7. The system of claim 5, wherein the one or more software modules are further configured to display data using the plurality of sonar color palettes.

8. The system of claim 5, wherein the one or more software modules are further configured to use the plurality of sonar color palettes to highlight different features of a displayed sonar image.

9. The system of claim 8, wherein the one or more software modules are further configured to use the plurality of sonar color palettes to highlight different types of underwater objects, which have different acoustic properties that are reflected in the sonar image.

10. The system of claim 5, wherein the one or more software modules are further configured to display last known date, time, location of a magnetic heading calibration, and diver depth.

11. The system of claim 5, wherein the one or more software modules are further configured to display a pinger locator feature.

12. The underwater handheld computer system of claim 2, wherein the underwater handheld computer comprises a multibeam imaging sonar that uses a 12 degree aperture on a 750k frequency band to increase resolution of a sonar image displayed on the display, and to reduce interference during targeting and detection of objects.

13. The underwater handheld computer system of claim 1, wherein the underwater handheld computer is configured to receive a selection of a mission marker and display a diver's position, heading, depth and course history for the selected mission marker.

14. The underwater handheld computer system of claim 1, wherein the display is configured to display sonar images using a plurality of sonar color palettes.

15. The underwater handheld computer system of claim 13, wherein the underwater handheld computer is further configured to display:

the diver's position and speed over ground;

the height of the diver above the seabed;

pressure sensor data; and water column depth.

16. The underwater handheld computer system of claim 14, wherein the underwater handheld computer is further configured to display data using the plurality of sonar color palettes.

17. The underwater handheld computer system of claim 14, wherein the underwater handheld computer is further configured to use the plurality of sonar color palettes to highlight different features of a displayed sonar image.

18. The underwater handheld computer system of claim 17, wherein the underwater handheld computer is further configured to use the plurality of sonar color palettes to highlight different types of underwater objects, which have different acoustic properties that are reflected in the sonar image.

19. The underwater handheld computer system of claim 14, wherein the underwater handheld computer is further configured to display last known date, time, location of a magnetic heading calibration, and diver depth.

20. The underwater handheld computer system of claim 13, wherein the underwater handheld computer is further configured to display a pinger locator feature.

21. The underwater handheld computer system of claim 13, wherein the underwater handheld computer comprises a multibeam imaging sonar that uses a 12 degree aperture on a 750k frequency band to increase resolution of a sonar image displayed on the display, and to reduce interference during targeting and detection of objects.

* * * * *